(12) United States Patent
Bowman et al.

(10) Patent No.: US 9,917,693 B2
(45) Date of Patent: Mar. 13, 2018

(54) PROVIDING SECURITY ASSURANCE INFORMATION

(71) Applicants: BlackBerry Limited, Waterloo (CA); Certicom Corp., Mississauga (CA)

(72) Inventors: Roger Paul Bowman, Kitchener (CA); Catalin Visinescu, Kitchener (CA); Ming Chee Tsang, Mississauga (CA); Daniel Richard L. Brown, Mississauga (CA); Ravi Singh, Toronto (CA); Thomas Stiemerling, Mississauga (CA)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 52 days.

(21) Appl. No.: 14/935,238

(22) Filed: Nov. 6, 2015

(65) Prior Publication Data

US 2017/0118014 A1 Apr. 27, 2017

Related U.S. Application Data

(60) Provisional application No. 62/247,153, filed on Oct. 27, 2015.

(51) Int. Cl.
| | |
|---|---|
| *H04L 29/06* | (2006.01) |
| *H04L 9/08* | (2006.01) |
| *H04L 9/30* | (2006.01) |
| *G06F 21/33* | (2013.01) |
| *G06F 21/53* | (2013.01) |

(Continued)

(52) U.S. Cl.
CPC ............ *H04L 9/0825* (2013.01); *G06F 21/33* (2013.01); *G06F 21/53* (2013.01); *G06F 21/57* (2013.01); *H04L 9/30* (2013.01); *H04L 9/3268* (2013.01); *H04W 12/06* (2013.01); *H04L 63/0876* (2013.01); *H04W 12/00* (2013.01)

(58) Field of Classification Search
CPC ....... H04L 9/0825; H04L 9/30; H04L 9/3268; H04L 63/0876; G06F 21/33; G06F 21/53; G06F 21/57; H04W 12/06; H04W 12/00
See application file for complete search history.

(56) References Cited

U.S. PATENT DOCUMENTS

| | | | |
|---|---|---|---|
| 8,990,911 B2 * | 3/2015 | Olden | ................. H04L 63/0815 726/1 |
| 2002/0108041 A1 * | 8/2002 | Watanabe | ............. H04L 9/3252 713/175 |

(Continued)

OTHER PUBLICATIONS

Tamrakar, Sandeep et al.; "On Rehoming the Electronic ID to TEEs"; 2015 IEEE Trustcom/Bigdatase/ISPA; vol. 1; Aug. 20, 2015; pp. 49-56.

(Continued)

*Primary Examiner* — Mohammad A Siddiqi
(74) *Attorney, Agent, or Firm* — Fish & Richardson P.C.

(57) ABSTRACT

Systems, methods, and software can be used to provide security assurance information. In some aspects, a certificate request for a client process on a mobile device is received. A security assurance character for the client process is determined. Whether to grant the certificate request is determined based on the determined security assurance character. In response to determining to grant the certificate request, a certificate is generated.

14 Claims, 2 Drawing Sheets

(51) Int. Cl.
G06F 21/57 (2013.01)
H04L 9/32 (2006.01)
H04W 12/06 (2009.01)
H04W 12/00 (2009.01)

(56) References Cited

U.S. PATENT DOCUMENTS

| | | |
|---|---|---|
| 2003/0074555 A1 | 4/2003 | Fahn et al. |
| 2006/0048228 A1* | 3/2006 | Takemori ............... G06F 21/577 726/22 |
| 2006/0053302 A1* | 3/2006 | Yasaki .................. H04L 9/0822 713/183 |
| 2009/0268912 A1* | 10/2009 | Nakae ................... H04L 9/3213 380/270 |
| 2011/0035577 A1 | 2/2011 | Lin et al. |
| 2013/0083926 A1* | 4/2013 | Hughes ................. H04L 9/0836 380/278 |
| 2013/0152180 A1 | 6/2013 | Nair et al. |
| 2015/0052351 A1 | 2/2015 | Nodehi et al. |
| 2016/0248586 A1* | 8/2016 | Hughes ................. H04L 9/0852 |

OTHER PUBLICATIONS

Extended European Search Report issued in European Application No. 15197998.6 dated Apr. 19, 2016.

\* cited by examiner

PROVIDING SECURITY ASSURANCE INFORMATION

CROSS REFERENCE TO RELATED APPLICATIONS

This application claims the benefit of priority of U.S. Application Ser. No. 62/247,153, filed on Oct. 27, 2015, which is incorporated by reference herein in its entirety.

BACKGROUND

The present disclosure relates to providing security assurance information associated with a certificate. In some cases, a certificate can be used in an authentication process. For example, in a public-key infrastructure (PKI), a public key certificate can be used to prove the identity of an owner of the public key. The certificate can include information about the key, the owner's identity, and a digital signature of an entity that has verified the certificate's contents.

DESCRIPTION OF DRAWINGS

Like reference numbers and designations in the various drawings indicate like elements.

DETAILED DESCRIPTION

Figure 1:
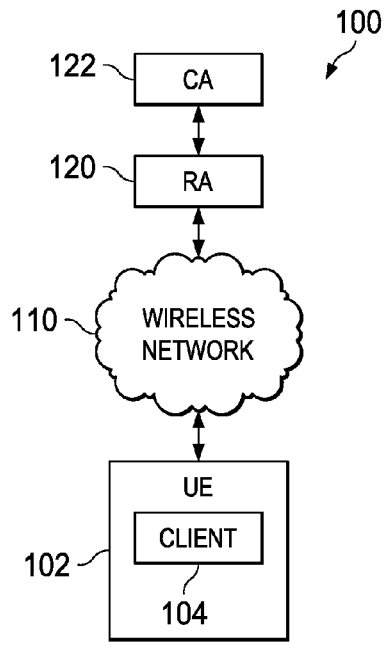
FIG. 1 is a schematic diagram showing an example communication system that provides security assurance information.

In some implementations, a service provider requests a client to provide a certificate before granting services to the client. If the certificate is valid, the service provider can trust the client and know that it can use the key associated with the certificate to communicate with the client. In some cases, to obtain a certificate, a client can request a certificate from a certificate issuing authority. In some cases, a certificate issuing authority can issue a certificate if the certificate issuing authority determines the identity of the client. The certificate issuing authority can be a certificate authority (CA), a registration authority (RA), or a combination thereof.

In some cases, the client can be a client process that operates on an electronic device, e.g., a user equipment (UE). In one example, the client process can be a platform process that is associated with the UE, e.g., a UE-level enrollment agent that provisions the certificate for the UE. In another example, the client process can be a software application running on the UE, e.g., an application-level enrollment agent that provisions a certificate for an application]. In some cases, a client process may need multiple certificates, each certificate associated with a procedure. For example, a platform process may request different certificates for authenticating a client, signing integrity data, or provisioning sensitive data to the UE.

In some cases, simply validating the certificate may not be sufficient for the service provider to grant a service. For example, the security mechanisms associated with requesting and maintaining the certificate may be different for different client processes. In some cases, a client process may run on a UE that includes specialized hardware processors for security-related functions. In these cases, the certificate is less likely to be compromised compared to a client process that runs on a UE without such specialized hardware processors. In some cases, a client process may generate or access a key associated with the certificate in a secured operating system. In these cases, the certificate is less likely to be compromised compared to a client process that generates or accesses the key in a normal operating system. Therefore, in some cases, a service provider may need to know information about the security mechanisms associated with a certificate in order to determine the confidence level of the certificate. For security sensitive services, a service provider may reject the service request if the service provider determines that the client process does not have a sufficiently secure security mechanism, even if the certificate can be validated. For example, the service may be rejected if the hardware of the UE that runs the client process does not meet the security requirement of the service provider. The service may also be rejected if the security procedures used by the client process, e.g., generating a key, does not meet the security requirement of the service provider.

In some cases, an issued certificate can include security assurance information associated with the client process. For example, a certificate can include one or more granted security assurance attributes. Each granted security assurance attribute can indicate a security assurance character determined by the certificate issuing authority. Examples of security assurance characters can include information about the UE, the key generation, the key access, and other security information associated with the client process for the certificate. Including security assurance information in the certificate enables a service provider to authenticate the level of security mechanisms associated with the client process, and determine whether to grant the service accordingly.

FIG. 1 is a schematic diagram showing an example communication system 100 that provides security assurance information. The example communication system 100 includes a UE 102 that is communicatively coupled with a registration authority (RA) 120 through a wireless communication network 110. The registration authority (RA) 120 is also communicatively coupled with a certificate authority (CA) 122.

Figure 2:
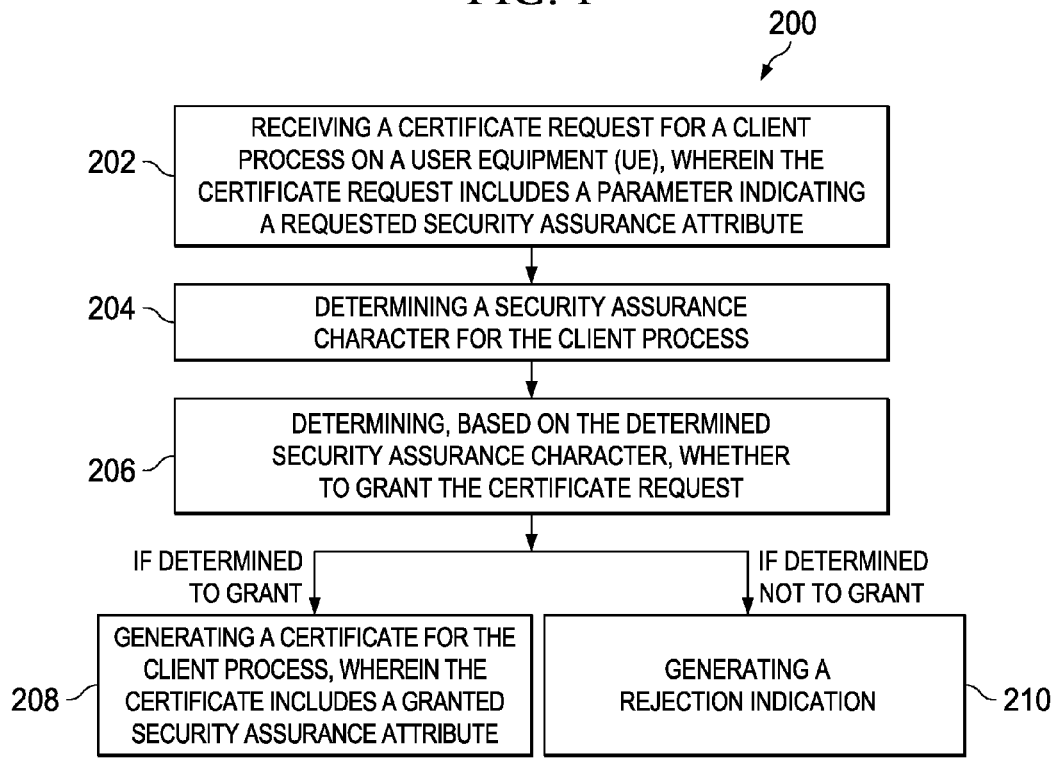
FIG. 2 is a flowchart showing an example process for providing security assurance information.

The RA 120 represents an application, set of applications, software, software modules, hardware, or combination thereof that can be configured to receive certificate requests and determine whether a certificate should be issued. In some implementations, the RA 120 can receive a certificate request from a client process on the UE 102. The RA 120 can determine a security assurance character associated with the client process, and determine whether to grant the certificate request based on the determined security assurance character. If the RA 120 determines to grant the certificate, the RA 120 can generate a certificate and include one or more granted security assurance attributes in the certificate. The RA 120 can forward the certificate to the CA 122 to sign. Once the certificate is signed, the RA 120 can send the signed certificate to the UE 102. If the RA 120 determines not to grant the certificate, the RA 120 can generate a rejection indication and send the rejection indication to the UE 102. FIG. 2 and associated descriptions provide additional details to these implementations.

The CA 122 represents an application, set of applications, software, software modules, hardware, or combination thereof that can be configured to sign a certificate. In some cases, the CA 122 is a trusted third party that is trusted both by an owner of a certificate and by a service provider relying upon the certificate. In some implementations, the CA 122 can receive a certificate from the RA 120, sign the certificate, and return the signed certificate to the RA 120.

In some cases, the RA 120 and the CA 122 can be implemented on the same hardware platform. Alternatively, the RA 120 and the CA 122 can be implemented on the different hardware platforms that are communicatively coupled. In some cases, some or all of the procedures discussed above with respect to the RA 120, e.g., determining a security assurance character associated with the client process, determining whether to grant the certificate request, and generating a certificate, including granted security assurance attributes in the certificate, can be performed at the CA 122, or jointly performed at the CA 122 and the RA 120. Alternatively or in combination, some or all of the procedures discussed above with respect to the CA 122, e.g., signing the certificate, can be performed at the RA 120, or jointly performed at the CA 122 and the RA 120.

As shown in FIG. 1, the example communication system includes the wireless communication network 110. The wireless communication network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for the UE 102 to communicate. The base station may be distributed throughout the cellular network to provide a wide area of coverage. The base station directly communicates to one or a plurality of UEs, other base stations, and one or more core network nodes. The base station may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others. Example wireless broadband communication systems include IEEE 802.11 wireless local area network, IEEE 802.16 WiMAX network, and others.

The example communication system 100 includes the UE 102. The UE 102 includes a client process 104. In some cases, the client process 104 can send a certificate request to the RA 120 through the wireless communication network 110. Examples of the certificate request can include a Simple Certificate Enrollment Protocol (SCEP) request, a request for conveying authN data based on a proprietary protocol, or any other request messages for a certificate. [As discussed previously, the client process 104 can be a platform process, an application process, or any other processes that can request and receive a certificate.

Turning to a general description, a UE, e.g., the UE 102, may be referred to as mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum. The term "UE" can also refer to any hardware or software component that can terminate a communication session for a user. In addition, the terms "user equipment," "UE," "user equipment device," "user agent," "UA," "user device," and "mobile device" can be used synonymously herein.

FIG. 2 is a flowchart showing an example process 200 for providing security assurance information. The process 200 can be implemented by any type of system or module in that responds to certificate requests and generates certificates including security assurance information. For example, the process 200 can be implemented by the RA 120 shown in FIG. 1. Alternatively or in combination, the process 200 can be implemented by the CA 122, or by the RA 120 and the CA 122 jointly. The example process 200 shown in FIG. 2 can also be implemented using additional, fewer, or different operations, which can be performed in the order shown or in a different order.

The example process 200 begins at 202, where a certificate request is received. In some cases, the certificate is initiated by a client process located on a UE. The client process can be any process that requests a certificate. In some cases, the certificate request is received at the RA.

In some cases, the certificate request can include one or more requested security assurance attributes. The one or more requested security assurance attributes can indicate the security assurance attributes that the client process requests to include in the certificate. A security assurance attribute can indicate the security assurance character associated with the certificate request. As described in more detail below, examples of security assurance characters include a UE security assurance character, a key generation security assurance character, or any other type of security assurance character.

From 202, the example process 200 proceeds to 204. At 204, a security assurance character for the client process is determined. The security assurance character can indicate the security characteristics of the UE, the process of generating the key and obtaining the certificate, or any other security characteristics.

In one example, the security assurance character can include a UE security assurance character. The UE security assurance character can indicate the security characteristics of the UE as manufactured. In some cases, the UE security assurance character can include a UE security level. The UE security level can be secure or insecure. In some cases, a set of criteria can be defined. If the UE meets the set of criteria, the UE security level is determined to be secure. If the UE does not meet the set of criteria, the UE security level is determined to be insecure. In some cases, the set of criteria can include whether or not security related computing functions are executed using a specialized hardware processor. Examples of security related computing functions can include computing challenge and response values, performing encrypting or decrypting functions, and other functions. If a specialized hardware processor is used for the computation, the UE security level can be determined to be secure.

If the computation is executed using software codes, the UE security level can be determined to be insecure.

In some cases, the UE security assurance character can also include an identification of the entity that secures a specialized hardware processor for security related computations. In some cases, a specialized hardware processor can be secured by making irreversible hardware alterations, e.g., burning one time programmable (OTP) fuses, to establish desired security characters. Examples of the hardware alternations can include setting secure boot, disabling hardware debug modes, e.g., according to joint test action group (JTAG) defined protocols, locking down the processor from further changes. In one example, the specialized hardware processor can be secured by a device manufacturer of the UE. In another example, the specialized hardware processor can be secured by a chip manufacturer that makes the central processor unit of the UE. For example, the secured specialized hardware processor can be incorporated as a part of the central processor unit in a silicon on chip (SOC) design. In some cases, if the specialized hardware processor is secured by the CPU manufacturer, or by another entity independent of the manufacturing process, the UE may be considered to be more secure because compromising the security of the specialized hardware processor would require collaboration between two separate entities.

In some cases, the UE security assurance character, e.g., the UE security level or the identification of the entity that secures the specialized hardware processor for security related computations, can be stored in a database. For example, a UE manufacturer, a UE processor manufacturer, or a combination thereof, can provide the information related to the UE security assurance characters to an RA. The RA can store the information in a database. When a certificate request is received, the RA can query the database to retrieve the UE security assurance character associated with the UE.

In some cases, the security assurance character can include a key generation assurance character. The key generation assurance character can indicate the security characteristics of the key generation process associated with the client process. In some cases, the UE security assurance character can indicate a key generation entity. For example, the key generation entity can be a high level operation system (HLOS) or a secure execution environment.

In some cases, a secure execution environment can include a set of security extensions that are configured to isolate an operating environment from the generating operating system of the UE. In some cases, an operation can be executed inside the secure execution environment, and therefore increase the security protection of the operation. One example of the secure execution environment is a trustzone (TZ). In one example, a request for certificate is initiated in the HLOS. The HLOS prepares the input parameters, e.g., a PIN, a certificate type, and a certificate ID. The HLOS passes the input parameters to the secure execution environment. In the secure execution environment, a key pair is generated for the requested certificate and the request is signed. The signed request is passed to the HLOS. The HLOS sends the request to the CA. In this example, because the key generation operation is executed in the TZ, the key generation entity is secure execution environment. On the other hand, if the key associated with the certificate request is generated in the HLOS, the key generation entity is HLOS.

In some cases, key generation assurance character can also indicate a key secure entity. For example, the key secure entity can be a HLOS or a secure execution environment. For example, if a key associated with the certificate request can be accessed only in the secure execution environment, the key secure entity is secure execution environment. On the other hand, if a key associated with the certificate request can be accessed outside of the secure execution environment, the key secure entity is HLOS.

A key generation assurance character can be determined based on the security agreement between an RA and a client process for certificate request. For example, the RA and the client process can agree on the types of authentication data to be provided when requesting a certificate. The RA and the client process can also agree on the type of algorithms to be used when signing the authentication data for a certificate request. Based on these agreements, the RA can determine the key generation entity and the key secure entity associated with the certificate request.

In some cases, a security assurance character can be determined to be unknown. For example, if the RA does not have access of the security assurance character associated with the UE or the key generation procedure, the security assurance character can be unknown.

In some cases, numerical representations can be used to indicate the security assurance characters. Table 1 shows an example.

TABLE 1

| Name of the security assurance parameters | Representing security assurance character | Numerical representations |
| --- | --- | --- |
| securityLevel | UE security level | 0: unknown; 1: insecure; 2: secure |
| processorSecuredBy | Entity that secures the specialized hardware processor | 0: unknown; 1: device manufacturer; 2: CPU manufacturer |
| keyGeneration | key generation entity | 0: unknown; 1: HLOS; 2: secure execution environment |
| keySecuredBy | Key secure entity | 0: unknown; 1: HLOS; 2: secure execution environment |

From 204, the example process 200 proceeds to 206. At 206, whether to grant the certificate request is determined based on the security assurance character. In some cases, the certificate request can be rejected if the security assurance character determined at 204 indicates a security assurance character that is less than the security assurance character requested by the client process. In some cases, the certificate request can be granted if the security assurance character determined at 204 indicates a security assurance that meets or exceeds the security assurance requested by the client process.

In one example, a client process requests a certificate with a high security character, e.g., key secured by secure execution environment. In the requested security assurance attribute field of the certificate request, the client process can set the keySecuredBy to 2. If the RA determines that the key secure entity of the client process is secure execution environment, then the RA can grant the certificate request. If the RA determines that the key secure entity of the client process is HLOS, the RA can reject the certificate request because the HLOS is more vulnerable to attacks than the secure execution environment.

In another example, a client process requests a certificate with a medium security character, e.g., key secured by HLOS. In the requested security assurance attributes field of the certificate request, the client process can set the keySecuredBy to 1. If the RA determines that the key secure entity of the client process is HLOS or secure execution environment, then the RA can grant the certificate request. If the RA determines that the key secure entity of the client process is unknown, the RA can reject the certificate request.

In some cases, if the security assurance character determined at 204 indicates a security assurance that is less than the security assurance requested by the client process, the RA can grant the certificate request but downgrade the security assurance attributes. In one example, a client process requests a certificate with a medium security character, e.g., key secured by HLOS. If the RA determines that the key secure entity of the client process is unknown, the RA can grant the certificate request but set the keySecuredBy in the granted security assurance attributes to 0.

In some cases, the RA can determine whether to reject or downgrade the certificate request based on the security assurance characters in addition to the requested security assurance characters. In one example, a client process requests a certificate with a medium security character, e.g., key secured by HLOS. In the requested security assurance attributes field of the certificate request, the client process can set the keySecuredBy to 1. If the RA determines that the key secure entity of the client process is unknown, but the UE security level is secure and the entity that secures the specialized hardware processor is the CPU manufacturer, the RA may determine to grant the certificate request with a downgrade because the RA has sufficient confidence in the security of the client process for the certificate request. On the other hand, if the RA determines that the key secure entity of the client process is unknown, and the UE security level is insecure, the RA may determine to reject the certificate request.

In some cases, the RA can determine whether to grant the request based on previous certificate requests. For example, a client process may have previously requested and received a certificate with a high security character, e.g., key secured by secure execution environment. If in the current request, the client process requests a lower security character, e.g., key secured by HLOS, the RA may determine to reject the reject because the current request may be made by a potential attacker that impersonates the client process. In some cases, the RA can store the record of requests in a database and retrieves the requests based on the requesting client process.

If the certificate request is determined to be granted, from 206, the example process 200 proceeds to 208. At 208, a certificate for the client process is generated. In some cases, the certificate can include one or more granted security assurance attributes. In some cases, the security assurance attributes can be included in the extension field in the certificate. In some cases, e.g., in a case of downgrade, the granted security assurance attributes can be different from the requested security assurance attributes. In some cases, the granted security assurance attributes can include more security assurance attributes than what are requested. For example, the client process can request a key generation security assurance character, e.g., key secured by secure execution environment, the RA can include both the key generation security assurance character and the UE security assurance character, e.g., the specialized hardware processor used for security function is secured by the device manufacturer, in the certificate.

In some cases, the generated certificate can be signed, e.g., by a CA. The signed certificate can be sent to the client process that requests the certificate. The client process can present the certificate that includes the granted security assurance attributes to a service provider in a service request. The service provider can determine whether the client process is sufficiently secure for being allowed to use the service.

If the certificate request is determined to be rejected, from 206, the example process 200 proceeds to 210, where a rejection indication is generated. In some cases, the rejection indication can be sent to the client process on the UE. In some cases, the rejection indication can include reasons for the rejection.

Figure 3:
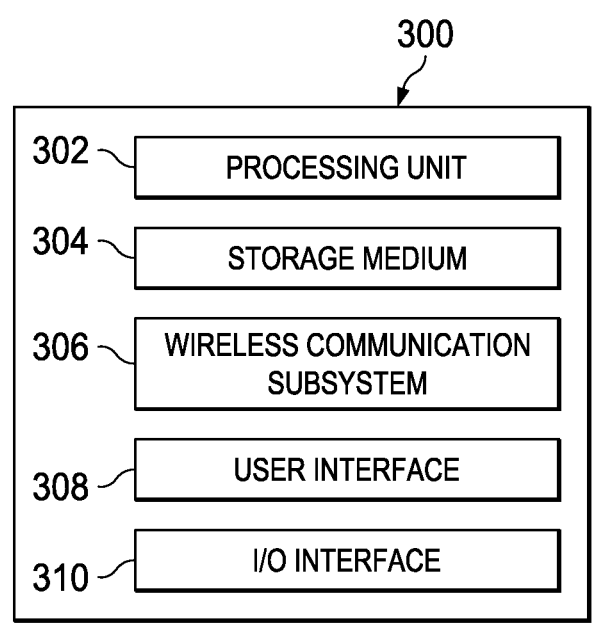
FIG. 3 is a block diagram illustrating an example user equipment (UE) device.

FIG. 3 is a block diagram illustrating an example user equipment (UE) device 300. The illustrated device 300 includes a processing unit 302, a computer-readable storage medium 304 (for example, ROM or flash memory), a wireless communication subsystem 306, a user interface 308, and an I/O interface 310.

The processing unit 302 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 302 may be configured to generate control information, such as a measurement report, or respond to received information, such as control information from a network node. The processing unit 302 may also be configured to make a Radio Resource Management (RRM) decision such as cell selection/reselection information or trigger a measurement report. The processing unit 302 can also include other auxiliary components, such as random access memory (RAM) and read-only memory (ROM). The computer-readable storage medium 304 can store an operating system (OS) of the device 300 and various other computer-executable instructions, logic or software programs for performing one or more of the processes, steps, or actions described above.

The wireless communication subsystem 306 may be configured to provide wireless communication for voice, data, and/or control information provided by the processing unit 302. The wireless communication subsystem 306 can include, for example, one or more antennas, a receiver, a transmitter, a local oscillator, a mixer, and a digital signal processing (DSP) unit. In some implementations, the subsystem 306 can support multiple-input multiple-output (MIMO) transmissions. In some implementations, the receiver in the wireless communication subsystems 306 can be an advance receiver or a baseline receiver. Two receivers can be implemented with identical, similar, or different receiver processing algorithms.

The user interface 308 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 310 can include, for example, a universal serial bus (USB) interface.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A method, comprising:
receiving a certificate request for a client process on a mobile device, wherein the certificate request includes a first requested security assurance attribute;
determining a security assurance character for the client process;
determining that the security assurance character represents a same or higher security level than the first requested security assurance attribute;
determining that the first requested security assurance attribute represents a same or higher security level than a second requested security assurance attribute in a previous certificate request; and
in response to determining that the security assurance character represents a same or higher security level than the first requested security assurance attribute, and that the first requested security assurance attribute represents a same or higher security than the second requested security assurance attribute in the previous certificate request, generating a certificate for the client process, wherein the certificate includes a granted security assurance attribute.

2. The method of claim 1, wherein the security assurance character includes a mobile device security assurance character.

3. The method of claim 1, wherein the security assurance character includes a key generation security assurance character.

4. The method of claim 1, wherein the granted security assurance attribute is different than the first requested security assurance attribute.

5. The method of claim 1, wherein the security assurance character is determined based on information provided by a manufacturer of the mobile device.

6. A device, comprising:
a memory; and
at least one hardware processor communicatively coupled with the memory and configured to:
receive a certificate request for a client process on a mobile device, wherein the certificate request includes a first requested security assurance attribute;
determine a security assurance character for the client process;
determine that the security assurance character represents a same or higher security level than the first requested security assurance attribute;
determine that the first requested security assurance attribute represents a same or higher security level than a second requested security assurance attribute in a previous certificate request; and
in response to determining that the security assurance character represents a same or higher security level than the first requested security assurance attribute, and that the first requested security assurance attribute represents a same or higher security than the second requested security assurance attribute in the previous certificate request, generate a certificate for the client process, wherein the certificate includes a granted security assurance attribute.

7. The device of claim 6, wherein the security assurance character includes a mobile device security assurance character.

8. The device of claim 6, wherein the security assurance character includes a key generation security assurance character.

9. The device of claim 6, wherein the granted security assurance attribute is different than the first requested security assurance attribute.

10. The device of claim 6, wherein the security assurance character is determined based on information provided by a manufacturer of the mobile device.

11. A tangible, non-transitory computer-readable medium containing instructions which, when executed, cause a computing device to perform operations comprising:
receiving a certificate request for a client process on a mobile device, wherein the certificate request includes a first requested security assurance attribute;
determining a security assurance character for the client process;
determining that the security assurance character represents a same or higher security level than the first requested security assurance attribute;
determining that the first requested security assurance attribute represents a same or higher security level than a second requested security assurance attribute in a previous certificate request; and
in response to determining that the security assurance character represents a same or higher security level than the first requested security assurance attribute, and that the first requested security assurance attribute represents a same or higher security than the second requested security assurance attribute in the previous certificate request, generating a certificate for the client process, wherein the certificate includes a granted security assurance attribute.

12. The tangible, non-transitory computer-readable medium of claim 11, wherein the security assurance character includes a mobile device security assurance character.

13. The tangible, non-transitory computer-readable medium of claim 11, wherein the security assurance character includes a key generation security assurance character.

14. The tangible, non-transitory computer-readable medium of claim 11, wherein the granted security assurance attribute is different than the first requested security assurance attribute.

* * * * *